Oct. 7, 1958 W. D. MACGEORGE 2,855,587
INDICATING SYSTEMS
Filed Dec. 18, 1953 3 Sheets-Sheet 1
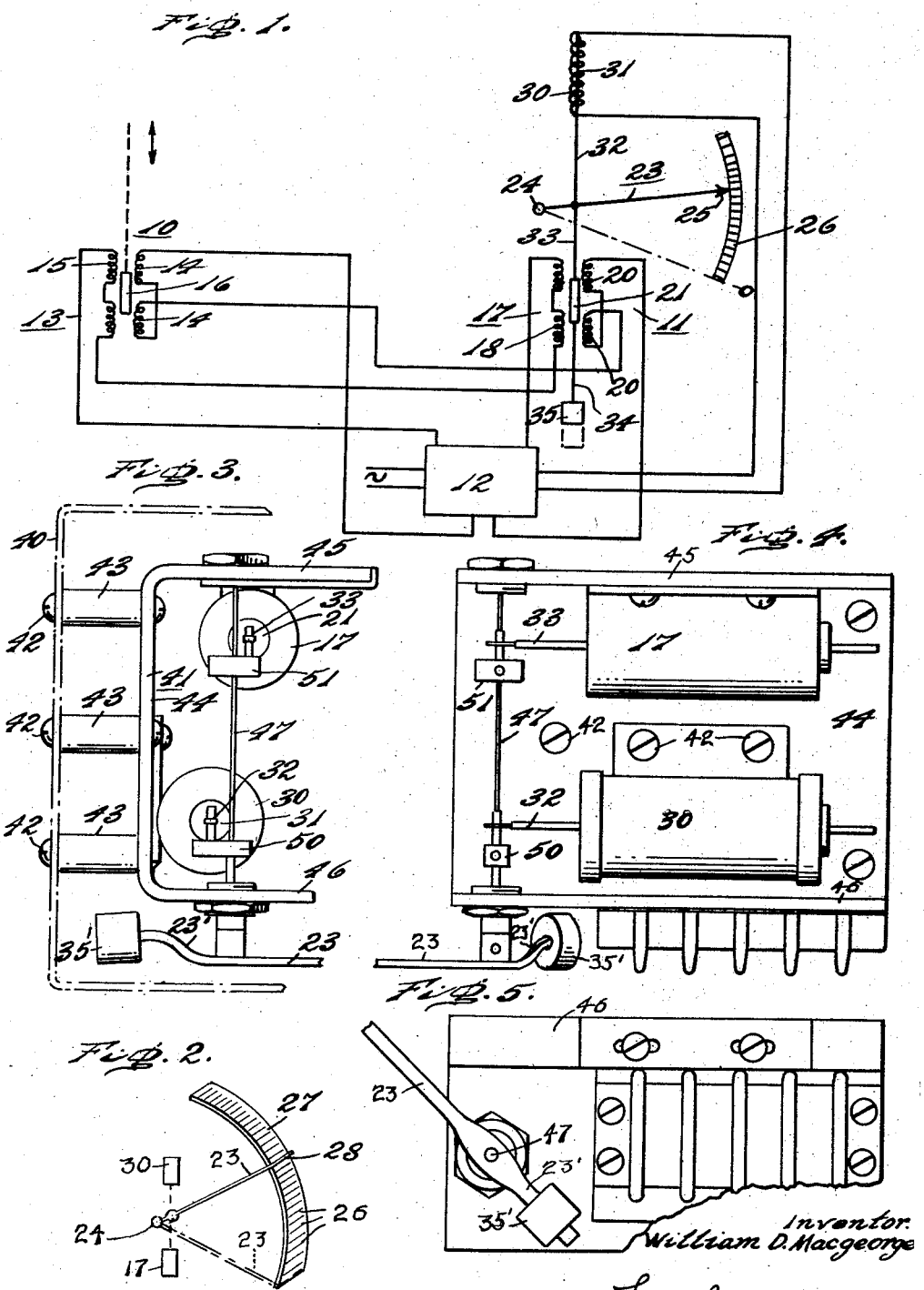
Inventor:
William D. Macgeorge
By. Frank H. Borden
Attorney.

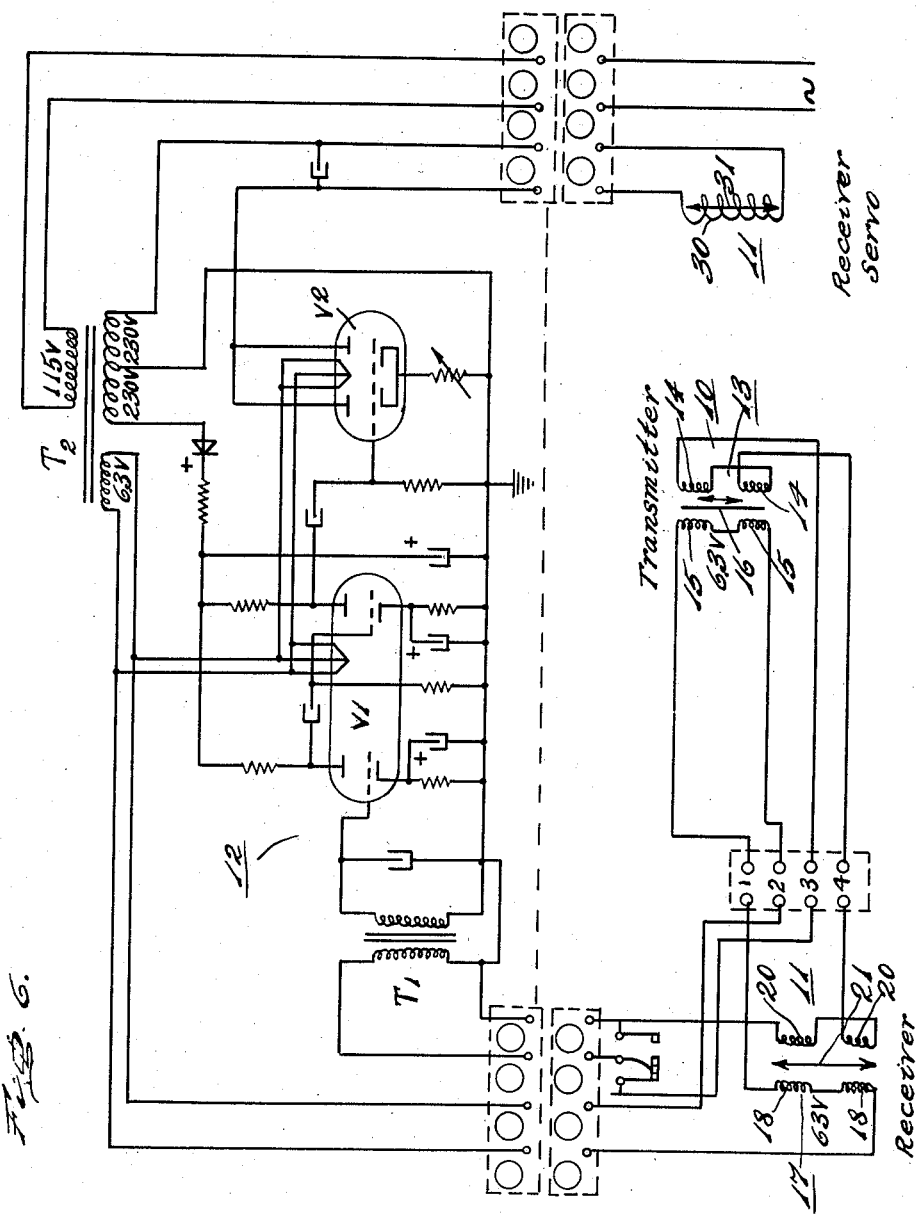

Oct. 7, 1958 W. D. MACGEORGE 2,855,587
INDICATING SYSTEMS
Filed Dec. 18, 1953 3 Sheets—Sheet 3
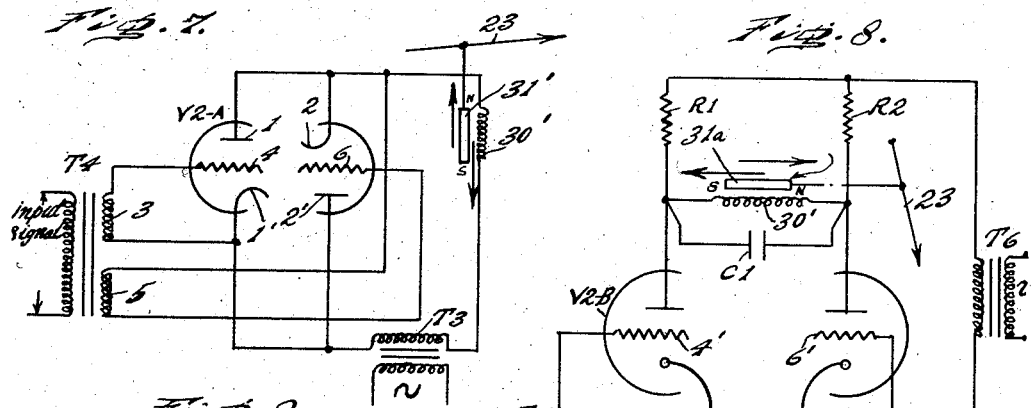
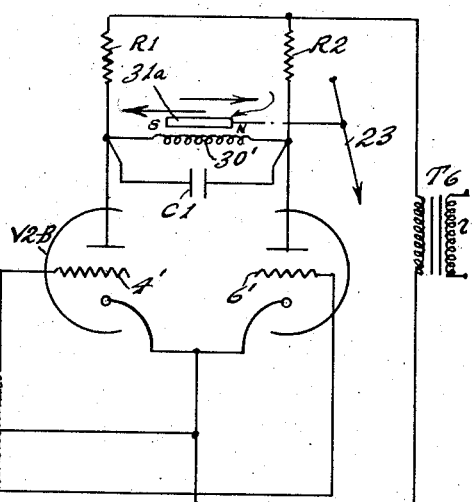
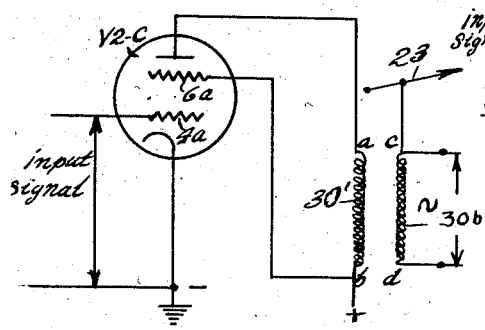
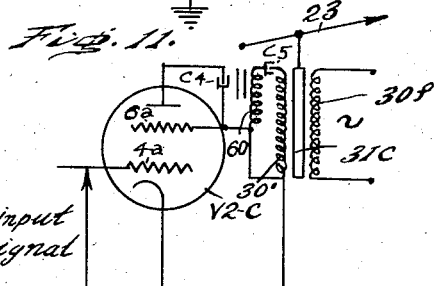
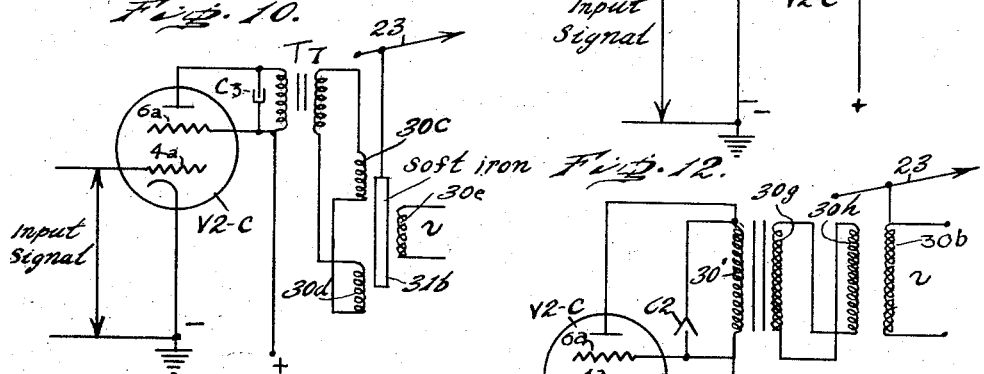
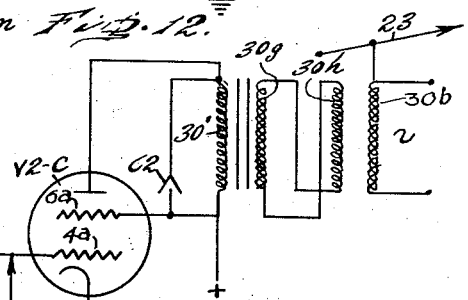
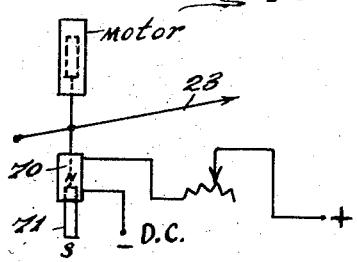
INVENTOR
William D. Macgeorge
BY
Frank H. Borden
ATTORNEY.

United States Patent Office 2,855,587
Patented Oct. 7, 1958

2,855,587
INDICATING SYSTEMS

William D. Macgeorge, Lansdale, Pa., assignor to Automatic Timing & Controls, Inc., a corporation of Pennsylvania Application December 18, 1953, Serial No. 399,024

4 Claims. (Cl. 340—187)

This invention relates to secondary remote electronic indicators, and the components thereof, and particularly to indicating systems incorporating a "fail-safe" feature.

While, as will appear, the invention is of broad scope and susceptible to utilization for the indication or recordation of condition of any variable, it is particularly useful in continuous indications of liquid level, and will be described for this purpose, as a purely illustrative exemplification.

It is among the objects of the invention to provide improvements in the art of indicating systems; to provide a simplified highly efficient liquid level indicating system; to provide a unique servo motor organization in an indicator or recorder; to provide an electronic indicating system with a simplified fail-safe feature; to provide in a receiver a movable indicator having two extreme positions toward one of which it is biased by a mechanical, electrical or electro-magnetic force, said receiver including a signalling device having an electrical signal output controlled by relative indicator position and progressively changing with continuous movement of the indicator in one direction, and said receiver also including an electromagnetic motor means developing force operative on the indicator against the bias, with said motor means energized functionally as the difference between an electric signal from a condition-responsive transmitter and the signal from the signalling device, to move the indicator under unbalance of opposing forces effective thereon and to position the indicator with balance of the opposing forces; to provide in a receiver a movable indicator movable in a range between two extreme limits toward one of which limits it is biased by a mechanical force, said receiver including an A. C. signal device controlled by indicator position, with the signal increasing in amplitude as the indicator moves from its limit toward which it is biased toward its said other limit, said receiver including a solenoid motor developing force on said indicator opposing the bias force, said solenoid energized by D. C. or A. C. from an amplifier as a function of the difference between an A. C. signal from a condition-responsive transmitter and said A. C. signal from the signalling device to move the indicator under unbalance of said opposing forces on the indicator and to position same under balance of said opposing forces by progressive deenergization of said solenoid motor as indicator movement reduces the difference between said two A. C. signals; to provide a receiver as just recited wherein the solenoid motor is replaced by a motor incorporating a moving coil; to provide a receiver with a motor of the solenoid or moving coil type in which failure of the electrical system permits the mechanical bias to move said indicator to its said one extreme position to indicate the failure of the electrical system; to improve servo mechanisms; to effect positioning of an indicator as a balance of force between the thrust of a solenoid and an opposing bias with means for varying the energization of the solenoid to establish such balance; to provide improvements in electronic circuits; to provide a transmitter and a receiver having circuit means for establishing a null balance between signals and an indicator positioned as a balance of opposing bias and electro magnetic forces attained without actual null between the respective signals; to provide a secondary remote electronic indicator in which the positioning of the indicator is effected by powered restoring forces in both directions; to provide a secondary remote electronic indicator with a fail-safe bias normally held out of operation during safe positioning of the indicator under opposing powered restoring forces to permit the positioning of the indicator to be a function of balance of the restoring forces, in which the fail-safe bias becomes effective only on some failure in the circuit; and to provide other objects and advantages as will become more apparent as the description proceeds.

In the accompanying drawings:

Fig. 1 represents schematically the system of the invention, with a pivoted pointer moving arcuately of a dial, and shown in full lines in an illustrative attitude relative thereto, indicative of a given condition of the associated variable, and showing in dotted lines substantially zero attitude or extreme position thereof to which the pointer is automatically biased upon failure of the power supply to or through the circuit.

Fig. 2 is a diagrammatic perspective of part of the indicating system showing the preferred semi-cylindrical graduated dial and the associated pointer organization thereof.

Fig. 3 represents a fragmentary plan of the servo mechanism of the receiver of the organization.

Fig. 4 represents a front elevation of the device of Fig. 3.

Fig. 5 represents a fragmentary side elevation of the device of Fig. 3.

Fig. 6 represents a wiring diagram of the illustrative circuitry of the system.

Fig. 7 represents a schematic diagram of a modified form of a portion of the circuit in which by means of back-to-back tube elements two-way powered actuation of the indicator is effected.

Fig. 8 represents a schematic diagram of a still further modified form of a portion of the circuit in which by a push-pull tube arrangement two-way powered actuation of the indicator is effected.

Figs. 9, 10, 11, and 12 represent schematic diagrams of portions of the circuit in which by a tube having two grids, two-way powered actuation of the indicator is effected, by which various electro-magnetic actuations of the element connected to the indicator can be effected, utilizing a D. C. power circuit for the tube.

Fig. 13 represents a fragmentary schematic diagram of an illustrative solenoid organization for neutralizing a fail-safe bias on the indicator, to permit the devices of Figs. 7 to 12 to position the indicator without compensating for the fail-safe bias.

In carrying out the invention in one illustrative form, a transmitter is provided emitting an electrical signal as a function of the instantaneous condition of the variable, an indicator is provided for movement through a range between limits and is mechanically biased with a force which is substantially constant throughout said range toward one limit, a signalling device is operably associated with the indicator having a signal which is functional with the position of the indicator, an electromagnetic motor is provided typified by a solenoid effective on the movable indicator in a thrust opposing the mechanical bias, and amplifying means is provided by which the difference between the value of the signals of the transmitter and of the signalling device can be applied to the energization of the electro-magnetic motor. It will be understood that the signals may be either A. C. or D. C. signals, and the electro-magnetic motor may be energized either by D. C. or by effective A. C. For illustrative purposes the signals are A. C. signals from means to be described, and the solenoid is D. C. actuated. The signal input can be D. C., which obviously can be readily converted to A. C., which would be balanced against the A. C. receiver signal, and vice versa. It will also be understood that although the invention contemplates primarily that the indicator or indicator means will be visual indication, it will be clear that the indicating means may include means for scribing a chart, such as a strip chart or the like, for example, or otherwise for effecting a record of the changes in condition of the variable.

Referring to Figs. 1 and 6, as a presently preferred embodiment of the invention, the indicating system comprises a transmitter 10, a receiver servo indicating organization 11, and an amplifier 12. Transmitter 10 comprises illustratively, but preferably, a differential transformer 13, formed of bucking secondaries 14—14 and a primary 15, in a stator organization, and an armature 16, coupled to a movable element of a condition-responsive organization for actuation axially of the stator. While obviously the variable may comprise any conditioned device, by changes in the condition or position of which the axial positioning of the armature can be varied, it will be assumed, purely for illustration, to comprise liquid level, in which the position of a float or like element (not shown), through suitable proportioning mechanism moves the armature 16 axially of the stator, proportionally to movements of such float. This proportioning connection is indicated by the dotted line connection and the double ended arrow beside same in Fig. 1.

The receiver comprises illustratively, but preferably, a differential transformer 17, having a primary 18, secondaries 20—20 in bucking relation, and an armature 21 axially positionable in the stator comprising coils 18 and 20—20 of the differential transformer 17. A pointer 23 comprising indicating means is pivoted at 24, and has a free end 25 movable in an arc relative to an arcuate series of dial-inscribed graduations 26. The pointer 23 is in predetermined unstable equilibrium and by gravity has a substantially constant exact force mechanical bias toward the zero extreme limit of the graduations. If desired, the mechanical bias may be supplied by a resilient device such as a negator spring or the like, not shown. As shown in Fig. 1, schematically, the graduations 26 may lie in a planar mounting on a planar dial swept by the end 25 of the pointer or indicator member 23. It is preferred, however, for visibility, that the graduations 26 be disposed for external viewing on the surface of a semi-cylindrical dial 27, swept by an angular extension 28 at the free end of the indicator arm or pointer 23, as indicated in Fig. 2. An electro-magnetic motor unit, illustratively a solenoid coil 30 and its movable core 31, is disposed with the core connected, through link 32, pivotally to the indicator arm 23 in predetermined, usually slight, radial spacing from the pivot 24, so as to exert leverage or torque force on said arm opposing the force of the mechanical bias, when the solenoid is energized. While, as noted, the solenoid may be A. C. or D. C. actuated, and also, in this latter case, the core 31 may comprise a permanent magnet, it is presently preferred that the solenoid be D. C. actuated and the core 31 is not magnetized. It will be apparent that any constant or fixed energization of the solenoid to develop force or leverage on the indicator arm adequate to overcome the uniform mechanical bias force would move the indicator to the other extreme positioning of its free end relative to the graduations 26. It is a feature of the invention, following any solenoid energization, adequate to preponderate over the bias force, to progressively reduce the energization of the solenoid as the arm 23 is moved against the bias until such low value of energization is attained that the solenoid force no longer preponderates and balance is attained between the force of the bias and the force from the solenoid, at which point the indicator 23 stops. To this end armature 21 of the receiver differential transformer is connected by a link 33 to the pointer or indicator arm 23 in radial spacing from the pivot 24, determined by and coordinated with the variable output of the receiver differential transformer as the armature 21 is moved. A weight 35, augmenting, or typifying the gravity bias component of the arm 23, may be suspended from the lower end of the armature 21. This may not be an actual added weight, if the mass of the pointer organization 23 is adequate to furnish the gravitational bias.

It is important to note that if the energization of the solenoid coil 30 stops, as through power failure, or failure of a tube or the like in the amplifier, the pointer or arm 23, by reason of the unopposed mechanical bias, drops to the lower extreme position as a "fail-safe" indication factor.

It will also be obvious that many different forms of linkages and levers can be used to effect the controlled positioning of the pointer arm 23. To indicate a present commercial form of the schematic organization just described, reference may be made to the servo organization of Figs. 3–5 inclusive, to follow. Before entering upon this, however, reference may be made to the circuit organization shown in Fig. 6.

The primaries 18 and 15 of the receiver and transmitter respectively are in series with the secondary of transformer T2, the primary of which is suitably energized from a source of A. C. voltage. The receiver secondaries 20—20 are in bucking series relation with the transmitter secondaries 14—14 in a loop circuit through the primary of transformer T1, the secondary of which supplies the first grid of tube or valve V1. The solenoid coil 30 is fed with D. C. pulses from tube or valve V2, varying in amplitude and length with the amplitude of the A. C. resultant signal on the secondary of transformer T1.

The action of the differential transformers is, of course, well known and established, and the functioning thereof in the instant circuit should be clear. However, a word may be said at this point as to the elasticity of the system for purposes of the invention. With either the transmitter or receiver differential transformer disclosed it will be understood that with the primary energized with low voltage, say, of the order of 6.3 v., and with the armature generally symmetrically centered in the stator, the voltages induced in the respective secondaries will be substantially equal, and being of respectively opposite phase, will be mutually cancelling so that the output of the secondaries of the instant transformer is substantially null. Movement of the armature relative to the stator from null in one direction will cause a resultant secondaries output of a given phase and of substantially linearly increasing amplitude. Movement of the armature from null in the other direction will cause a resultant secondaries output of the opposite phase and of substantially linearly increasing amplitude. With any given position of the armature of the transmitter, functional with variation of the liquid level, for instance, the transmitter signal will be of given or the opposite phase and of given or of substantially no amplitude. This resultant signal of the transmitter is in bucking relation to the output of the secondaries of the receiver, and the latter output depends upon the position of its armature in its stator. With the given signal from the transmitter being instantaneously appreciably off from balance with the output of the receiver secondaries circuit, the solenoid is energized by effective D. C. pulses from tube V2 adequate to develop a thrust on the indicator preponderating over the force of the bias, and the indicator 23 moves. However, indicator movement moves the armature of the transmitter to change the output of the receiver transformer secondaries to reduce the difference between the transmitter and receiver signals and thus to progressively reduce the energization of the solenoid until finally the indicator comes to rest when the solenoid energization is just that at which the solenoid force and the gravity bias are in balance. Obviously this must necessarily be a point at which there is still a difference between the transmitter and receiver signals, so that the complete secondaries circuit never attains true null, but it is a very small difference just adequate to maintain the balance with the gravity bias. It will be seen that with a change in the armature position in a signal-reducing sense the amplifier will still further reduce the energization of the solenoid by stopping or reducing the D. C. pulses to a point at which its thrust force is less than the gravity bias and the indicator starts to move under the bias. Movement of the indicator changes the output of the secondaries of the receiver to progressively increase the energization of the solenoid until the force of the solenoid again just balances the gravity bias and the indicator stops.

While it is contemplated that the full sweep of outputs of both differential transformers from one side of null, through null to the other side of null may be used, in some cases it is preferred that only half of the total signal be used. Thus, the zero liquid level could coincide with the null output position of the armature in the transmitter differential transformer, so that the signal from the zero level is always of one given phase and of amplitude increasing from the zero level to the maximum liquid level of the tank or the like being indicated. Similarly, the receiver differential transformer would only use half of the available output in effecting substantial but not complete cancellation of the transmitter signal.

Assuming a static condition of the system and the indicator arm 23 at a given attitude, let it be assumed that there is a change in the liquid level, for instance, being measured. Let it be assumed that the level rises, and the armature of the transmitter is moved to increase the amplitude of the signal from its secondaries. The signal from transformer T1 increases in amplitude with a consequent increase in amplitude of the A. C. signal of proper phase on the grid of tube V1, which will cause increase of the amplitude and length of pulses of D. C. from tube V2 on the solenoid coil 30. This effects axial force on the core 31, which starts to elevate the indicator arm 23. On the other hand, with a lowering of the liquid level and a reversal of the phase of the resultant signal from T1, tube V1 is blocked, no pulses of D. C. energize the solenoid and the indicator moves down under the gravity bias until, with such movement the signal is first nulled and then again reversed and the solenoid re-energized to just that degree necessary to hold the indicator in a new balanced setting, functional with the instantaneous liquid level. This is further explained hereinafter.

Elevation of the arm 23 moves the armature 21 of the receiver differential transformer and increases the output of its secondaries in such sense as to decrease the amplitude of the resultant signal on T1, to decrease the amplitude of D. C. pulses on the solenoid which is progressively deenergized. According to the magnitude of the change in the condition of the variable, at some point the decrease of energization of the solenoid coil progresses to that point at which the arm 23 comes to rest as a balance of opposing bias and electro-magnetic forces, and this point is directly related to the magnitude of the condition of the variable, and the indicator position is a direct function of that condition. With a decrease of magnitude of condition of the variable, as will be clear, there is a decrease in signal from the transmitter, which instantaneously becomes smaller than that from the differential transformer of the receiver, and the signal to the solenoid decreases to such degree that the mechanical bias can assert itself to cause the indicator arm to lower, with consequent reduction in the signal from the receiver until some point is reached at which the balance of forces on the indicator arm 23 is re-established at a new setting representative of the then condition of the variable.

It will be seen also that interruption of the power supply or any interruption thereof through the amplifier, by failure of an electrical part, will effect such deenergization of the solenoid coil 30 as to permit the gravity bias to be completely effective to drop the pointer 23 to its lowermost position, typifying zero.

Referring to Figures 3 to 5 inclusive, a main instrument housing is partially indicated at 40 in dotted lines in Fig. 3, upon which a structural supporting member 41 is removably attached, as by pins 42 and spacing collars 43. Member 41 comprises a back plate 44 and side plates 45 and 46, each generally perpendicular to the back plate. The generally parallel side plates 45 and 46 are suitably apertured in alignment to rotatably mount a main shaft 47 forming the pivot axis 24, for the indicator pointer 23, external of side plate 46. In this case the pointer shaft 23 is extended across the pivot 24 as at 23', which adjustably mounts a weight 35'. In this case weight 35' is a counterweight and the actual biasing weight is comprised of the excess weight of pointer 23 itself.

The solenoid coil 30 is mounted on the back plate 44, with its axis extending vertically inwardly of the shaft 47 and between this shaft and the back plate 44. A crank arm 50 is keyed to the shaft 47, to the throw of which link 32 is pivoted, and the latter mounts the solenoid core 31. The differential transformer 17 is mounted on the side plate 45, with its axis spaced outwardly of shaft 47 by substantially the same or a predeterminedly related distance as the axis of the solenoid is spaced inwardly thereof, and the armature 21 thereof is connected by the link 33 to crank arm 51.

The semi-cylindrical dial 27 is axially of the same width as the spacings between side plates and is removably mounted directly thereto, and forms an enclosure concealing the working parts of the mechanism. The outer end 28 of the indicator pointer or arm 23 is generally normal to the indicator and overlies and extends appreciably across the outer face of the semi-cylindrical dial 27. Generally the whole organization just described is enclosed in a protecting enclosure mounted on support 40, including glass or other transparencies, whereby the operator can observe the relation of the sweeping arm end 28 to the graduations 26 on the semi-cylindrical dial 27. It will be understood, of course, that the axis of generation of the semi-cylindrical dial is substantially coincident with the axis of shaft 47.

It will be apparent from the circuit of Fig. 6 that the solenoid coil 30 is disposed in the plate circuits of both sides of the tube V2, and that the energization of the coil 30 is from zero to an energization of maximum amplitude of one polarity, as there is no transmission through tube V2 with reversal of signals in the null balance differential transformer secondaries circuit. With this organization therefore the solenoid motor effects powered positioning of the indicator in only one sense with one restoring force, while the opposing bias effects the restoring force in the other sense. This effects positive but not necessarily rapid response. This type of system incorporating merely adequate zero positioning torque may perhaps best be used in systems where other functions than mere indication is involved, as, for example, in recording, or the actuation of signals, controls, alarms, and the like.

It will be appreciated that in situations requiring rapid, low-lag response, it might be better to provide a circuit and a motor providing two-way power-positioning of the indicator.

A relatively simple form of circuit for powering the motor and energizing the core or amature in both directions from null is shown in Fig. 7. In this case tube V2-A, has a back-to-back hook-up, with left hand plate 1 and right hand cathode 2 connected through coil 30' to one end of the secondary of power transformer T3, with the other end of this secondary connected to the right hand plate 2' and to the left hand cathode 1'. A signal input transformer T4 is provided having secondaries, respectively 3 and 5. Secondary 3 connects between left hand grid 4 and cathode 1. Secondary 5 connects between right hand grid 6 and cathode 2 by the line connecting plate 1 and cathode 2 to the motor coil 30'. Transmission through the tube V2–A and through motor coil 30' will be in the direction controlled by the instantaneous polarity of the respective components of the tube, as will be understood. With null signals on the grids the flow through coil 30' will be null.

The circuit just described requires small power expenditures, and effects two-way restoring forces on the permanently magnetized core 31', as indicated by the arrows.

In the circuit indicated in Fig. 8, one form of push-pull circuit is indicated, in which the signals from the differential transformer secondaries are incident upon the primary of transformer T5. Tube V2–B is a double tube, the respective grids 4' and 6' of which are connected to opposite ends of the secondary of transformer T5, while the cathodes of the tubes connect to a median point on that secondary. The cathodes connect to one end of the secondary of the power transformer T6, and the other end of that secondary is connected to the respective anodes or plates of the tube, through respective resistances R1 and R2, in a bridge circuit, the output of which is the coil 30' of the motor in parallel with a condenser C1. It will be clear that this condenser C1 may be removed from its parallel disposition and placed in series with coil 30' of this figure to effect a resonant response according to the frequency used. Here again the existence of a null signal on the primary of transformer T5 provides insufficient energy on the grids of the tube to cause the flow of voltage therethrough. With a signal of one sense, i. e. of given amplitude and given phase, one grid is instantaneously plus and the other instantaneously minus, and when the plates are instantaneously plus and the cathodes instantaneously minus, current flow is through the side of the tube with the instantaneously plus grid voltage. This causes a flow through the motor coil 30' in one direction and actuates the core accordingly. Reversal of the signal, causing flow through the other side of the tube V2–B, causes a reversal of the flow through the motor coil 30'. While this requires more power, in view of the interposed resistances, this also is a system which effects powered restoring force on the indicator in both directions. In this case the armature 31a comprises a permanent magnet, attracted or repelled according to the polarity of the pulses passing through the coil 30'. It will be understood that the transformer T5 could be replaced by a tube with similar functioning, if desired.

In Fig. 9 and also in Figs. 10, 11 and 12, still a further modification of the circuit is disclosed, wherein the tube V2–C has, illustratively, two grids, although an ordinary triode may be used. The motor-actuating current is modulated D. C. Grid 6a, when used, is simply a flow-augmenter element. The input signal from the secondaries circuit is across the cathode and the grid 4a, the cathode-anode current is from a separate D. C. power source, one pole of which goes to the cathode, and the other pole of which goes to the plate through motor coil 30'. This organization as thus far described is common to Fig. 9 and all succeeding figures but Fig. 13. In one organization of an operating servo unit, as disclosed in Fig. 9, a moving coil 30b is disposed in juxtaposition to coil 30', and energized by a source of A. C. in phase or 180° out of phase with the input signal on the grid 4a. Moving coil 30b is connected to the indicator arm 23, and reacts with the signal-output-energized motor coil 30' to effect controlled movements in both senses of indicator movement, according to the modulation of the D. C. current output. Of course, if desired for enhanced efficiency, stationary soft iron (not shown) may be disposed adjacent to coils 30b and 30'.

As indicated in Fig. 10, the modulated D. C. cathode-anode current is across the primary of a transformer T7 containing iron, paralleled by a condenser C3. The secondary of transformer 17 is in a closed loop circuit with two coils 30c and 30d, connected in series bucking relation, in operative relation to a soft iron armature 31b, polarized instantaneously by a coil 30e, energized by a source of A. C. which is in phase, or 180° out of phase, with the signal on the grid 4a. The armature 31b is coupled to the indicator 23 for actuating same in both directions relative to its path of movement.

As indicated in Fig. 11, the energization of the motor coil 30' by the modulated D. C. cathode-anode current, is through a choke coil organization comprising the condenser C4, the coil 60, containing iron, and through coupling condenser C5 to motor coil 30', in operative relation to soft iron armature 31c. An energizing coil 30f is provided for coupling to a source of A. C. in phase, or 180° out of phase, with the signal on grid 4a.

Fig. 12 is similar to Fig. 9, in the presence of the motor coil 30' and juxtaposed indicator-connected moving coil 30b, with its A. C. energization, but is additionally constituted to remove the D. C. component of the output signal passing through the motor coil, by shunting the motor coil 30' by a condenser C2, and placing an iron core adjacent to the motor coil. An intermediate loop circuit is provided comprising a coil 30g, adjacent to the iron and in a series-loop circuit with a coil 30h juxtaposed to the moving coil 30b.

While there are many other versions of the circuits available for securing the controlled power-actuated opposing forces, the foregoing are illustrative. It will be seen of Figs. 9 to 12 inclusive that the D. C. power supply has superposed upon it D. C. pulses from the energizing A. C. circuit.

In utilizing the two-way powered motors of Figs. 7 to 12, it will be seen that the motor is in a null-balance system with the indicator or pointer maintained at the null point by opposed restoring forces on each side of the null position. The fail-safe feature represents a constant force and in its simplest form is a force of smaller magnitude than the positioning forces and is directly superimposed. This results in off-setting of positioning response with respect to the null point by a constant differential amount, which differential can be cancelled in calibration of the instrument, if this may be preferred. The magnitude of the differential and its effects can be better grasped or understood if an assumption of the value of the biasing fail-safe force is made. With the restoring forces equal and opposing the imposition of the fail-safe force on the indicator effectively increases the restoring force on one side and decreases it by a similar amount in the other direction. If selection of the magnitude of the fail-safe force effects a force of one-half of the maximum restoring forces of the motor, this would effect a resultant restoring force of one and one-half the maximum amplitude in one sense and a resultant restoring force in the opposite sense of one-half of the maximum restoring force. It is for this reason that for many applications the solenoid motor of Figs. 1 to 6, operative in one sense only against the biasing fail-safe force, may be preferred, as, although somewhat more lethargic in response, it does not need any especial compensating calibration. However, it is possible to avoid compensating calibration and have an exact null balance by the double acting motor device of Figs. 7 to 12, by the provision of means operative to neutralize the biasing force during normal operation, with the fail-safe factor coming into play only when some failure in the electrical circuitry occurs. According to this phase of the invention in an illustrative embodiment the fail-safe factor, which may be gravitational as discussed, or may be by a negator spring, and is of substantially, if not completely, an exact value throughout the range of indicator movement, is neutralized and substantially exactly balanced by an electro-magnetic force of fixed value supplied by some end points of the circuit. Illustratively, as shown in Fig. 13, this comprises a solenoid so disposed that the core develops force which cancels or neutralizes the fail-safe bias during operative conditions of the circuit. This is preferably incorporated in the system utilizing the differential motor or solenoid with a magnetized core, to effect null balance positioning of the indicator or pointer by equal restoring forces thereon from the motor, and without any necessity for calibrating for the fail-safe force. With any failure in the line of circuitry, the neutralizing effect of the neutralizing solenoid or like element is withdrawn, and as the restoring forces on the indicator from the motor have also been withdrawn, the biasing force becomes active to move the indicator or pointer to the datum or zeroed position. The neutralizing solenoid may be a separate agency, and, for illustrative purposes will be indicated as solenoid winding 70, operative on the magnetized core 71 of Fig. 13, energized from the amplifier, with constant voltage, adjustably effective on the coil 70, to exert a force balanced against and neutralizing the fail-safe bias on the indicator.

In connection with the various means for effecting the fail-safe bias, use may be made of a negator spring effective against an otherwise balanced indicator or pointer, or, if desired, a small permanent magnet may be located in fixed relation close to the axis or hub of the indicator and the latter may mount a small mass of iron or properly placed magnet always within the flux field of the fixed magnet, without effecting actual contact therewith.

It will be clear that various modifications and refinements of the system disclosed may be made without departing from the principles and spirit of the invention, and such are to be construed as within the scope of the invention as defined in the appended claims.

Having thus described my invention, I claim:

1. An instrument of the class described, comprising a movable indicator having a path of movement, circuit means including first means functionally responsive to the condition of an associated variable for producing a variable first signal and second means functionally responsive to the position of said indicator on its path for producing a second signal, said indicator being biased on its path by a substantially uniform bias force, unidirectional electromagnetic means supplied by said circuit means imposing electromagnetic force on said indicator variable according to the relative values of the respective first and second signals and in opposition to said bias force, said first and second signals having one predetermined proper relation of steady state values at which the supply to said electromagnetic means produces an electromagnetic force which balances the bias force and holds the indicator stationary in an attained position on its path, and said first and second signals having other relations of unsteady state values incident to change of value of said first signal in which the electromagnetic force is different from the bias force and the respective forces are unbalanced causing movement of said indicator until the said second signal value is changed to reestablish said predetermined proper relation of steady state values at which the respective forces are balanced.

2. An instrument for substantially linearly indicating the condition of a variable comprising a movable indicator, means for biasing said indicator in one direction with a force of substantially constant value in all positions of the indicator, electromagnetic means for biasing said indicator in the opposite direction with a force variable with the energization of the electromagnetic means, signalling circuit means and an amplifier for controlling the energization of said electromagnetic means between that at which the force thereof is superior to and inferior to said bias force to move said indicator and in a steady state of energization the electromagnetic means develops a force equal to and balancing said bias force to hold said indicator in a stationary setting, said signalling circuit means incorporating means responsive to the condition and changes of condition of a variable to change the energization of the electromagnetic means from the steady state energization thereof to unbalance the forces on the indicator to cause same to be moved, and said signalling circuit means incorporating means responsive to the movement of the indicator to modify the change of energization of the electromagnetic means until the said steady state energization becomes effective to balance the forces on the indicator and to stop the latter in a new setting linearly related to the new condition of the variable.

3. A condition indicator comprising a mechanically biased movable indicator, the force of said bias being substantially uniform in all positions of said indicator, solenoid motor means for applying electromagnetic force on said indicator in opposition to said bias force, circuit means having a steady state condition in which said solenoid motor means is energized to develop electromagnetic force on the indicator adequate to just balance the bias force to hold the indicator stationary in a setting, said circuit means including means responsive to a change of condition of a variable for modifying the steady state energization of said solenoid motor means to vary the electromagnetic force and unbalance the forces on the indicator to move the indicator, said circuit means incorporating means responsive to movement of the indicator to first reduce the modification of the steady state condition to change the electromagnetic force on the indicator to modify the unbalance of forces thereon and then to restore said steady state condition with the indicator in a new stationary setting according with the change in condition of such variable.

4. As an article of manufacture for operative association with a transmitter emitting a first phased signal of amplitude functional with variations in condition of an associated variable and an amplifier, a support comprising parallel spaced vertical plates, a horizontal shaft extending transversely between and perpendicular to the plates and having an extension projecting beyond one plate, said shaft journalled for oscillation, an indicator arm mounted on said extension and having an arcuate path of oscillation generally parallel to said plates externally thereof, counterweight means on said shaft out of balance with the indicator arm whereby a substantially constant mechanical bias force is on said shaft, a solenoid coil disposed internally of and between said plates, a core for said coil, a lever arm connecting said core to said shaft whereby electromagnetic force opposing said bias force is incident on said shaft and varies with variations in energization of said coil, a differential transformer coil disposed internally of and between said plates, an armature for said differential transformer coil, a lever arm connecting said armature to said shaft for producing a second phased signal of amplitude functional with movements of said shaft with the phase opposite to that of such first transmitter signal, said respective coils being parallel to said plates, an arcuate member generated substantially about the axis of said shaft and extending transversely between the plates to effect therewith an enclosure housing said coils and the shaft between the plates.

References Cited in the file of this patent

UNITED STATES PATENTS

| | | |
|---|---|---|
| Re. 23,850 | Roper | July 13, 1954 |
| 2,354,902 | Wolferz | Aug. 1, 1944 |
| 2,363,799 | Mahurin | Nov. 28, 1944 |
| 2,420,539 | Hornfeck | May 13, 1947 |
| 2,662,223 | Brewer | Dec. 8, 1953 |
| 2,662,540 | Rutherford et al. | Dec. 15, 1953 |